No. 768,809. Patented August 30, 1904.

UNITED STATES PATENT OFFICE.

GEORGE McCLELLAN LAWTON, OF WORCESTER, MASSACHUSETTS.

DYEING COMPOSITION.

SPECIFICATION forming part of Letters Patent No. 768,809, dated August 30, 1904.

Application filed June 6, 1904. Serial No. 211,400. (No specimens.)

*To all whom it may concern:*

Be it known that I, GEORGE MCCLELLAN LAWTON, a citizen of the United States, residing at Worcester, in the county of Worcester and State of Massachusetts, have invented new and useful Improvements in Dyeing Compositions, of which the following is a specification.

My invention pertains to dyeing, and contemplates the provision of an advantageous developer for use in connection with the mordant constituting the subject-matter of my contemporary application, filed January 4, 1904, Serial No. 187,693, and the fastener or mordant forming the subject-matter of my contemporary application of even date herewith.

At times in the practice of finishing accidents to machinery and other causes necessitate leaving the materials being finished in the various baths or else in a wet state for an undue period, and frequently materials having different shades and colors, especially black and white, are laid together. In consequence of this the colors usually run together, stain and change the shades desired, and thereby occasion considerable loss.

My invention seeks to provide means for effectually preventing the black in dyed materials from running into or staining other colors or shades when the materials are left in the baths or are laid together in a wet state.

In carrying out my invention I follow the ordinary well-known process of dyeing, with the exception that I add a peculiar acid to the mordant and a peculiar developer and a peculiar fastener or mordant to the finishing-bath.

The "developer" is so termed because it is designed to bring out the shade, while the "fastener" or "mordant" is so denominated because its purpose is to set or fasten the shade.

To produce a permanent and stainless logwood black, I employ the mordant constituting the subject-matter of my application filed January 4, 1904, which mordant consists of bichromate of potash, oxalic acid, and my peculiar acid. These ingredients are combined in the proper proportions to give the shade desired, and the composition is boiled for about one and one-half hours. My peculiar acid just mentioned is in the form of a liquid, and is composed of water, some suitable substance containing gluten, either cream of tartar or tartaric acid, or both, bichromate of soda, bicarbonate of soda, nitrate of soda, oxalic acid, pyroligneous acid, nitrate of iron, and sulfuric acid. The proportions of these ingredients may obviously be varied according to the depth of shades required.

The finishing-bath employed is composed of chip or extract of logwood, other dyes to give the desired cast of shade, and my peculiar developer. These ingredients are varied to give the shade desired. The said finishing-bath is boiled for about one and one-half hours, and to it the peculiar fastener or mordant forming the subject-matter of my contemporary application of even date herewith is added.

My novel developer incorporated in the finishing-bath is composed of bicarbonate of soda, ground sumac, ground nutgalls, ground flavin, orange or lemon, and ground fullers' earth, and the proportions which I find give the best results are bicarbonate of soda, ten per cent.; ground sumac, ten per cent.; ground nutgalls, ten per cent.; ground flavin, ten per cent., and ground fullers' earth, sixty per cent. The said developer is in the form of a powder, and the proportions of its ingredients are varied to suit the wishes of the user.

The fastener or mordant which is added to the finishing-bath is a liquid, is boiled for about forty-five minutes, and is composed of water, sulfate of iron, pyrolignite of iron, and nitrate of iron combined in suitable proportions.

Experience has demonstrated that when my novel acid, developer, and fastener or mordant are employed there is no liability of the colors of the materials dyed running together or becoming stained or changed in shade when the materials are left in the baths for an undue period or are laid together in a damp or wet state. Experience has also demonstrated that materials dyed in accordance with my invention have an absolute fast color and one calculated to withstand the strongest sunlight.

I have entered into a detailed description of the preferred embodiment of my invention in order to impart a full, clear, and exact understanding of the same. I do not desire, however, to be understood as limiting myself to any specific proportions of ingredients, as such proportions may be varied and such other changes may be made in practice as fairly fall within the scope of my invention as claimed.

Having described my invention, what I claim, and desire to secure by Letters Patent, is—

1. A developer for use in a finishing-bath, composed of bicarbonate of soda, sumac, nutgalls, flavin and fullers' earth.

2. A finishing-bath for use in dyeing, composed of the following ingredients, viz: logwood, and a developer composed of bicarbonate of soda, sumac, nutgalls, flavin and fullers' earth.

In testimony whereof I have hereunto set my hand in presence of two subscribing witnesses.

GEORGE McCLELLAN LAWTON.

Witnesses:
  EDGAR L. SPAULDING,
  GEO. W. SPAULDING.